Aug. 3, 1943.   R. C. JONES   2,326,036
CIRCUIT CONTROLLING APPARATUS
Filed Oct. 18, 1941   2 Sheets-Sheet 1

WITNESSES:
Leon M. Garman

INVENTOR
Ruel C. Jones.
BY James N. Ely
ATTORNEY

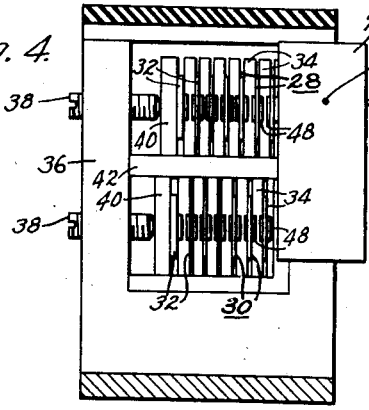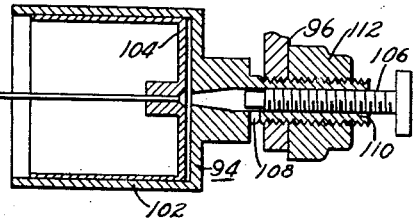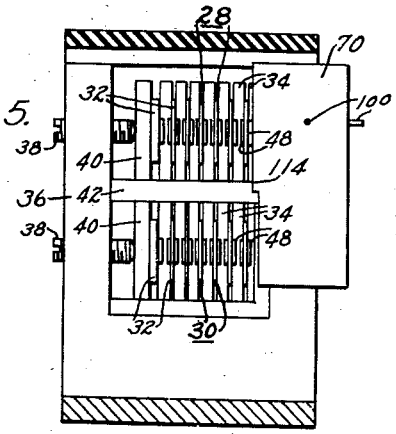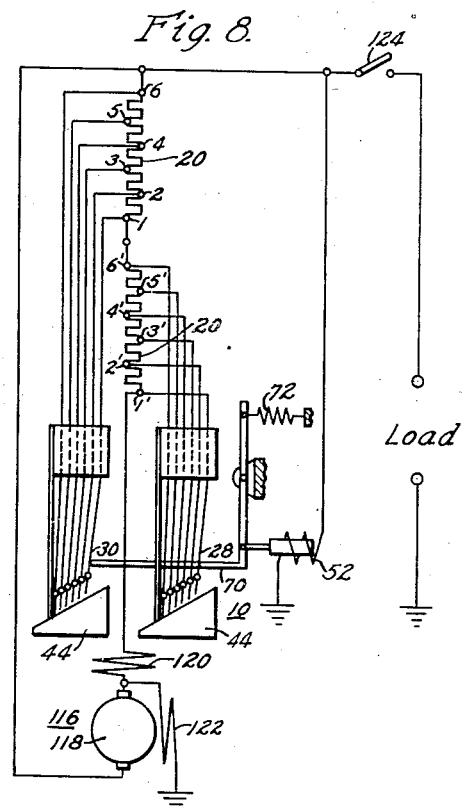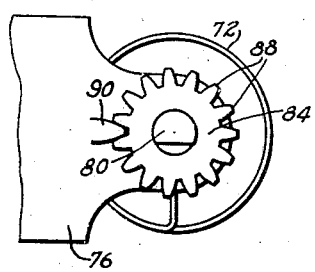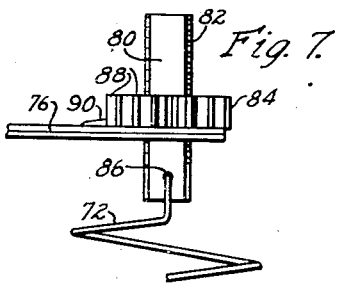

Patented Aug. 3, 1943

2,326,036

UNITED STATES PATENT OFFICE 2,326,036

CIRCUIT CONTROLLING APPARATUS

Ruel C. Jones, Wilkinsburg, Pa., assignor to Westinghouse Electric Manufacturing Company, East Pittsburgh, Pa., a corporation of Pennsylvania Application October 18, 1941, Serial No. 415,614

12 Claims. (Cl. 200—97)

This invention relates to electrical apparatus and, in particular, to circuit controlling apparatus.

In equipping aircraft or the like with voltage regulators, it is necessary to maintain the size and weight of the apparatus at a minimum. In meeting these requirements, the effectiveness and efficiency of the apparatus must be maintained. The circuit controlling device of the regulator must be stable in operation over a wide range of temperature and atmospheric changes. This is especially true where the circuit controlling device is to be employed in aircraft which operate at altitudes as high as 35,000 feet above sea level, and in which the temperature changes encountered vary over the range of −40° C. to +50° C. In such circuit controlling devices, it is also necessary to obtain a large number of switching operations with a very limited movement.

An object of this invention is to provide in a circuit controlling device for obtaining a large number of switching operations for a given movement of an actuating member.

A further object of this invention is to stabilize the actuating member of a circuit controlling device to prevent sudden and excessive movement of the actuating member.

A more specific object of this invention is to provide for adjusting the bias of a spring biased actuating member of a circuit controlling device, and to so stabilize the actuating member as to prevent sudden and excessive movement thereof.

Other objects of this invention will become apparent from the following description when taken in conjunction with the accompanying drawings, in which:

Fig. 4 is a view partly in section taken along the line IV—IV of Fig. 1;

Fig. 5 is a plan view partly in section illustrating another embodiment of certain of the features of this invention;

Fig. 6 is a plan view greatly enlarged of a detail of the circuit controlling device of Fig. 1;

Fig. 7 is a view in elevation of the detail shown in Fig. 6; and

Fig. 8 is a schematic diagram illustrating the embodiment of the circuit controlling device of this invention as employed in a regulating system.

Figure 1:
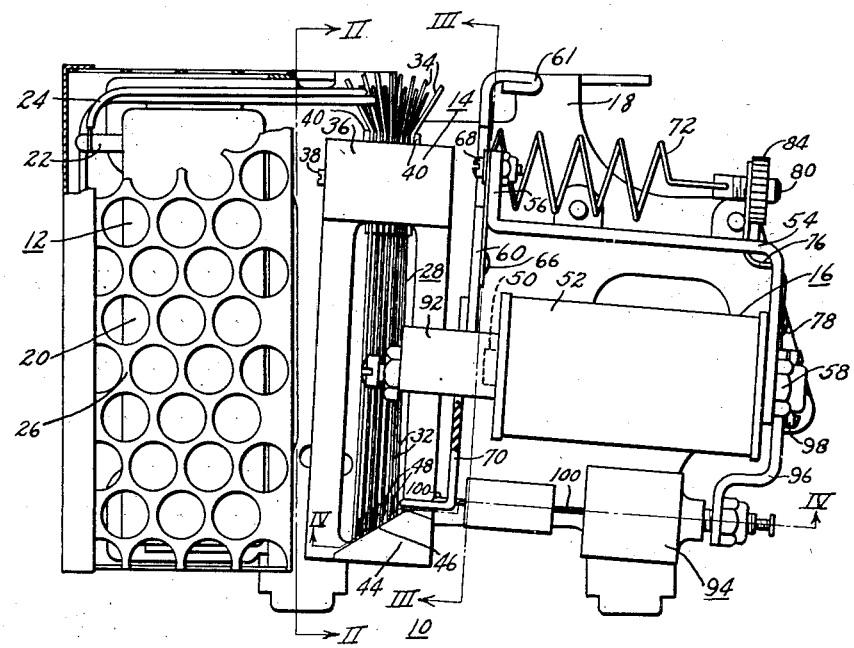
Figure 1 is a view in elevation of the circuit controlling device embodying the teachings of this invention.

Referring to Figure 1, this invention is illustrated as applied to a circuit controlling device 10 comprising a resistor unit 12, a switching apparatus 14 and an electromagnetic device 16 disposed to control the operation of the switching apparatus 14, and all of which are suitably mounted on a supporting base 18.

The resistor unit 12 may be of any suitable type or, as shown, may comprise a resistance element 20 provided with spaced taps 22 for securing leads 24 from the switching apparatus 14 and encased in a perforated guard or protective housing 26.

Figure 2:
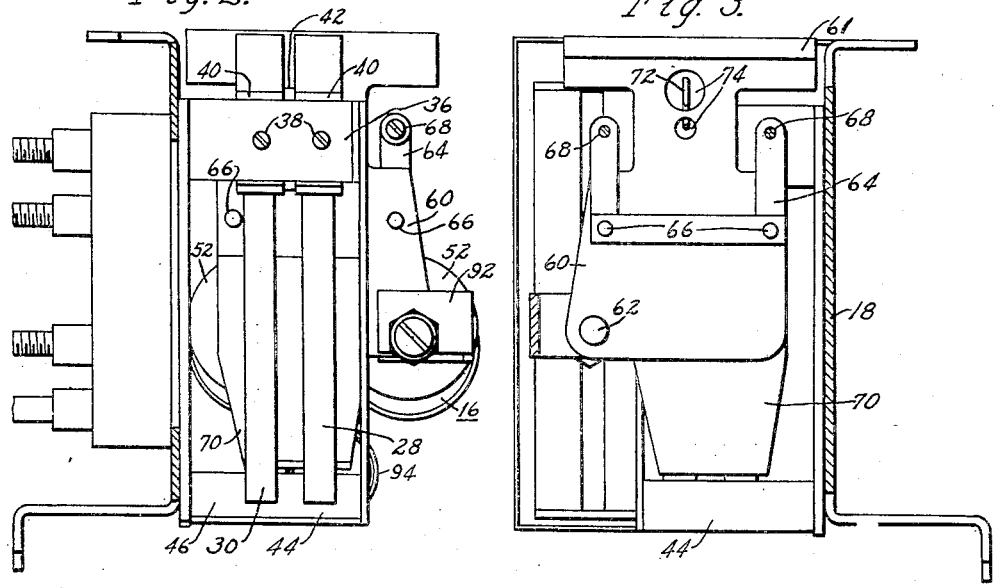
Fig. 2 is a view of the circuit controlling device taken along the line II—II of Fig. 1.

The switching apparatus 14 comprises a plurality of identical and cooperating switching assemblies 28 and 30. Each of the switching assemblies 28 and 30 comprises a plurality of elongated self-biased spring leaf members 32 having one of their ends insulated from one another by means of layers 34 of suitable insulating material, such as fishpaper or the like, and fixedly supported with respect to each other in an insulated clamping member 36, the details of which are not shown. In this embodiment, the two assemblies 28 and 30 are retained in the same clamping member 36, as illustrated in Fig. 2, an adjustable screw 38 being provided for applying pressure to a pressure plate 40 associated with each assembly, the assemblies being separated by a layer 42 of insulating material.

The other ends of the spring leaf members 32 of each of the assemblies are free to move away from an adjustable stop 44, the stop being provided with a beveled or sloped surface 46 for receiving and spacing the ends of the biased members 32 for limiting their movement in the self-biasing direction.

Each of the spring leaf members 32 is of good conducting material, such as beryllium-copper alloy, and carries a contact button 48 near its free end. The contact buttons 48 are so positioned that as the spring leaf members 32 are actuated away from the sloped surface 46 of the stop 44, the contact buttons of each assembly are progressively actuated into engagement. As illustrated, the projecting ends of leaf members 32 adjacent the fixed end of the assemblies are connected by the leads 24 to different taps between the sections of the resistor unit.

The specific details of the assemblies 28 and 30 are more clearly disclosed and described in Patent No. 2,246,301, which issued to C. R. Hanna et al., and which is assigned to the same assignee as this invention.

In the preferred embodiment of this invention illustrated in Figs. 1 through 4, the switching assemblies 28 and 30 are positioned and clamped in a predetermined manner in which the individual leaf members 32 of one of the assemblies are interleaved relative to the individual leaf members 32 of the other of the switching assemblies, and the leaf members of the two assemblies are connected in a predetermined manner by leads 24 to progressive taps of the resistor unit. The purpose of this arrangement will be explained more fully hereinafter.

The electromagnetic device 16 illustrated comprises a U-shaped core member 50 of magnetic material formed of two leg members and a yoke member 54 secured thereto by screws 58. Energizing windings in the form of a coil 52 are mounted on each leg of the core member and are disposed to be energized in a predetermined manner from a suitable source of power (not shown). The yoke member 54 in addition to bridging the legs in forming the core 50 also constitutes an elongated bracket, as illustrated, having two upwardly extending legs 56 at one end thereof. The upwardly extending legs 56 are disposed and utilized for mounting an armature member 60 in operative relation with respect to the core and coil assembly and the switching assemblies 28 and 30.

Figure 3:
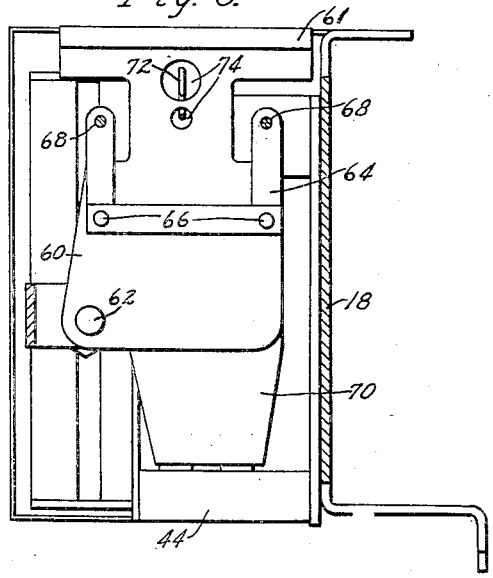
Fig. 3 is a view of the circuit controlling device taken along the line III—III of Fig. 1.

The armature member 60, as illustrated in Fig. 3, is of elongated form being provided with a counterweight 61 at its upper end and carries a contact button 62 of non-magnetizable material at its lower end positioned to seat against the end of one of the legs of the core member 50 to prevent the direct contact of the armature with the core member. The armature member 60 is disposed to be pivotally secured to the upwardly extending legs 56 of the bracket 54 by means of the spring pivot member 64. The spring pivot member 64 is of substantially U-shape, the base of the pivot member 64 being secured to the armature member 60 as by means of the rivets or screws 66. The legs of the pivot member 64 are spaced in the same manner as the upwardly extending legs 56 of the bracket 54, and are secured to the legs 56 by means of the screws 68.

As illustrated in Figs. 1 through 3, the lower end of the armature member 60 carries a driving member 70 disposed to actuate the spring leaf members 32 of each of the assemblies 28 and 30 to effect a progressive switching operation of each of the switching assemblies as the armature 60 is moved. Preferably, the driving member 70 is of insulating material for insulating the armature 60 from the conducting leaf springs 32 of the switching assemblies.

In order to balance the magnetic pull on the armature member 60 when the coils 52 are energized, a coil spring member 72 is provided. One end of the coil spring member 72 is secured to the upper end of the armature member 60 below the counterweight 61, as illustrated in Fig. 3, the end of the spring 72 being hooked through suitable openings 74 provided in the upper end of the armature 60. The other end of the coil spring 72 is adjustably secured to an upwardly extending bracket 76, which is secured to the electromagnetic device as by means of the rivet 78.

Referring to Figs. 6 and 7, the adjustable securing means for securing the coil spring 72 to the bracket 76 is more clearly illustrated. The bracket 76 is provided with an opening therethrough having a flat side. An elongated stud member 80, having a thread 82 provided over a portion thereof adjacent one of its ends and which has a cross-section complementary to the shape of the opening in the bracket member 76, is disposed in the opening. Because the cross-section of the stud member 80 is complementary to the shape of the opening in the bracket 76, the stud 80 is movable longitudinally through the opening but can not be rotated therein. An internally threaded nut 84 is provided for cooperating with the threads 82 on the elongated stud 80, and is disposed on one side of the bracket member 76. The end of the elongated stud 80 which projects through the opening is provided with an opening 86 for receiving the end of the coil spring 72.

In order to prevent accidental movement of the adjusting nut 84, the nut 84 is provided with a series of teeth 88 about its periphery which cooperate with a projection 90 provided on the bracket 76 for normally locking the adjustable nut in any given position. The projection 90 may be formed in any suitable manner, such as by punching or deforming it out of the bracket 76 and is of a size and shape for fitting between and engaging any two of the teeth 88 provided about the periphery of the nut 84 to prevent rotative movement of the gear nut.

In order to adjust the bias of the spring 72, it is necessary to so manually move the elongated stud 80 longitudinally through the bracket 76 in a direction away from the coil spring 72 a sufficient distance that the teeth 88 provided on the nut 84 clears the projection 90 provided on the bracket 76. The gear nut 84 may then be turned any predetermined amount for adjusting the tension of the spring 72. After adjusting the position of the nut 84, the pull of the spring 72 is sufficient to return the nut 84 into its locked position with the projection 90 when the manual force is released from the nut.

In practice the bracket 76 is formed of a bimetallic material for aiding in compensating for any change in temperature encountered. The bimetal bracket 76 functions to automatically increase the tension of the coil spring 72 as the temperature decreases to substantially balance or off-set any decrease in the resistance of the energizing windings 52 and consequently any increase in the ampere turns of the windings due to the decrease in the temperature.

Referring again to Fig. 1, a magnetic trimmer 92 is provided for cooperating with the armature 60 to compensate for the change in stiffness of the leaf spring members 32 of the switching assemblies as they are actuated. The magnetic trimmer 92 is substantially U-shaped, and is secured to and constitutes an extension of one of the legs of the core member 50 for providing a variable gap and consequently a variable magnetic pull on the armature 60 as the leaf spring members 32 are actuated. The details of the magnetic trimmer 92 are not shown, but may be had by reference to the copending application of K. A. Oplinger, Serial No. 416,171, filed October 23, 1941, and assigned to the same assignee as this invention.

In order to stabilize the operation of the armature 60 and the driving member 70 to prevent excessive switching operations of the leaf spring members 32, a stabilizer comprising a dashpot 94 is provided. As illustrated in Fig. 1, the dashpot 94 is carried by a bracket member 96 secured to the electromagnetic device by the screw 98, and is operatively connected by a fine, straight, stiff wire 100 of spring bronze to the driver member 70 to oppose sudden movements thereof.

Referring to Fig. 4, the details of the dashpot 94 are more clearly illustrated. The dashpot 94 comprises a case 102 and a plunger 104 movably disposed therein formed of stainless steel. The plunger 104 makes a very close fit with the inside walls of the case 102, substantially no leakage of air being found between the side walls of the respective members. The escape of air from the air space between the plunger 104 and the case 102 is controlled by means of the needle valve 106, which cooperates with the port 108 provided in the tubular and threaded stud 110, by which the dashpot 94 is secured to the bracket 96. In practice, a nut 112 is provided for cooperating with the tubular elongated stud 110 for locking the dashpot in position with respect to the bracket 96. The thin stiff wire 100 preferably has a diameter of about .018 inch and is secured to the plunger 104 as by means of brazing, the other end of the wire projecting through an opening in the side of the driving member 70 and terminating in a hook which is secured to the driving member 70 by projecting through an opening provided in its base.

By making the plunger and the case of the dashpot 94 of the same stainless steel material, the dashpot is made self-compensating for changes in temperature. This is because each of the plunger and case members being of the same material has the same coefficient of expansion and any change in the case is also found in the plunger whereby the operation of the dashpot is unaffected by such changes.

In the embodiment illustrated in Fig. 4, the spring leaf members 32 of the switching assemblies 28 and 30 are alternately disposed so that, in effect, they are interleaved relative to one another. Thus, as the driving member 70 is actuated against the spring leaf members of the switching assemblies, the spring leaf members of the assemblies are actuated in a progressive, but staggered, relation, so that for a movement of the driving member 70 to actuate the spring leaf members of either one or the other of the assemblies throughout their operating range, twice as many switching operations are effected as would be effected if only one of the switching assemblies were present.

In the embodiment illustrated in Fig. 5, the switching assemblies 28 and 30 are positioned with their leaf members 32 in aligned relation, but the driving member 70 is provided with a stepped or offset contacting surface 114, the size of the step depending upon the spacing between the individual leaf members of the switching assemblies. In practice, the step of the stepped contacting surface 114 is preferably one-half of the distance between the contact buttons of the leaf members 32 when they seat against the sloped surface 46 of the stop member 44. In this embodiment, the same effect is accomplished, a progressive staggered operation of the leaf members 32 of the two assemblies being obtained as the driving member 70 is actuated.

Referring to Fig. 8, the circuit controlling device of this invention is illustrated as employed in a regulating circuit for controlling the voltage of a generator 116. The generator 116 may be driven by any suitable motor or prime mover (not shown), and comprises an armature winding 118, a shunt field winding 120 and a series field winding 122. As illustrated, one side of the armature winding 118 is connected to ground through the series field winding 122, the other side of the armature winding being disposed to be connected through a switch 124 to a load (not shown) and thence to ground. Two regulating resistor units or elements 20 each of which are formed of a number of resistor sections which are disposed to be connected in series circuit relation with the shunt field winding 120 is provided for controlling the excitation of the field winding.

As illustrated, the circuit controlling device 10 of this invention is disposed for controlling the number of sections of the series connected resistor elements 20 which are connected in circuit with the field winding 120. The switching assemblies 28 and 30 have the terminals of their leaf members 32 progressively connected to the taps 1 through 6 and 1' through 6', respectively, of their associated resistor elements 20 for controlling the number of sections connected in circuit in response to predetermined voltage conditions of the circuit. The energizing coil 52 for actuating the driving member 70 is connected in shunt with respect to the load, so that its energization will be a measure of the voltage drop across the load.

In operation, assuming that the generator 116 is driven to deliver a predetermined voltage, then the circuit controlling device 10 is operated in a predetermined manner whereby a number of the sections of the resistor elements 20 are connected in series circuit relation with the field winding 120. If for any reason the load supplied by the generator 116 is changed, for example, if the load is decreased, then the coil or winding 52 is energized to actuate the driving member 70 against the bias of its spring member 72 to effect a progressive, but staggered, release of the leaf members 32 of the switching assemblies 28 and 30 to alternately control the connecting of the progressive sections of each of the resistor elements 20 in series circuit with the field winding to effect a decrease in the energization of the field winding 120 and thereby decrease the voltage of the generator 116.

Assuming that the circuit controlling device 10 has been operated to connect all of the sections of the resistor elements 20 in circuit with the field winding 120, then if the load is increased, the winding 52 is so deenergized that the driving member 70 is actuated under the influence of the spring member 72 to effect a switching operation of the switching assemblies 28 and 30. In the embodiment illustrated, the driving member 70 first contacts the first leaf spring member of switching assembly 30 to force it away from the sloped stop and engage the second leaf member to shunt the resistor section between taps 1 and 2 of its associated resistor section. A very slight additional movement of the driving member 70 actuates the first leaf spring member of the switching assembly 28 to engage the second leaf spring member of the switching assembly 28 to effect the shunting of the resistor section between the taps 1' and 2' of its associated resistor element 20. A further movement of the driving member 70 forces the second leaf spring member of the switching assembly 30 into engagement with the third leaf spring member of that assembly to shunt the resistor sections between the terminals 1 and 3, and, in effect, remove an additional section between the terminals 2 and 3 from circuit with the field winding 120. This staggered progressive operation of the circuit controlling device 10 to effect the alternate shunting of progressive sections of each of the resistor elements 20 is continued until a sufficient number of the resistor sections is shunted from circuit with the field winding 120 to increase the energization of the field winding and effect the necessary increase in the voltage of the generator 116.

By utilizing the circuit controlling device of this invention, a large number of switching operations can be effected through a very small movement of the elements of the circuit controlling device. Further, the operation of the circuit controlling device is stabilized and, by reason of the dashpot, excessive movement of the switching apparatus is prevented, thereby preventing over-regulation where the circuit controlling device is employed in regulating the voltage of a generator. Because of the construction of the stabilizing dashpot, it is found that the operation of the circuit controlling device is uniform over a wide range of temperatures and pressures, such circuit controlling device having been successfully employed under conditions in which changes in temperature of from −40° C. to +50° C. and atmospheric pressures such as are encountered at heights of up to 40,000 feet above sea level are encountered.

Although this invention has been described with reference to a particular embodiment thereof, it is, of course, not to be limited thereto except insofar as is necessitated by the scope of the appended claims.

I claim as my invention:

1. In a circuit controlling apparatus, in combination, a plurality of switching assemblies, each of the switching assemblies comprising a plurality of spring biased switches, a spring biased armature member for actuating progressively the spring biased switches to closed positions with the switches of one assembly being actuated in staggered relation with the switches of the other assembly, and electromagnetic means for actuating the armature member to effect the progressive staggered release of the spring biased switches of the different switching assemblies.

2. In a circuit controlling apparatus, in combination, a plurality of switching assemblies, each of the switching assemblies comprising a plurality of spring biased switches, a spring biased armature member for actuating progressively the spring biased switches to closed positions, the switching assemblies being so disposed with respect to each other and the armature member that the spring biased switches of one assembly are actuated in progressive staggered relation with the spring biased switches of the other assembly, and electromagnetic means for actuating the armature member to effect the progressive staggered release of the spring biased switches of the different switching assemblies.

3. In a circuit controlling apparatus, in combination, a plurality of switching assemblies, each of the switching assemblies comprising a plurality of spring biased switches, a spring biased armature member for progressively actuating the spring biased switches of each of the switching assemblies to closed positions, the spring biased switches of one of the assemblies being disposed in interleaved relation relative to the spring biased switches of another of the assemblies, and electromagnetic means for actuating the armature member to effect the progressive staggered release of the interleaved spring biased switches.

4. In a circuit controlling apparatus, in combination, a plurality of switching assemblies, each of the switching assemblies comprising a plurality of spring biased switches, a spring biased armature member for actuating progressively the spring biased switches of each of the assemblies, a driving member carried by the armature member disposed to engage the switches, the driving member having a stepped engaging face for engaging the switching assemblies in different order to actuate the switches of one of the assemblies in interleaved relation relative to the switches of another of the assemblies, and electromagnetic means for actuating the armature member to effect the progressive staggered release of the spring biased switches of the different switching assemblies.

5. In a circuit controlling apparatus, in combination, a plurality of spring biased switches, means for progressively actuating the spring biased switches to closed positions, said means comprising a spring biased armature member, a driving member carried by the armature member, and stabilizing means associated with the driving member for preventing sudden movement of the driving member, the stabilizing means comprising an air dashpot having a stationary case and a plunger movably disposed therein formed of stainless steel, the plunger being of a size to make a close sliding fit within the case, an elongated tubular stud carried by the case disposed to communicate with the air space therein, a port disposed in the side of the tubular stud, a valve disposed in the tubular stud for controlling the ingress and egress of air through the port to and from the air space in the case, means for mechanically coupling the plunger to the driving member whereby movement of the driving member is retarded by the dashpot, the stainless steel plunger and case being self-compensating for changes in temperature to give stable operation of the actuating means, and electromagnetic means for actuating the stabilized and compensated actuating means to effect the progressive release of the spring biased switches.

6. In a circuit controlling apparatus, in combination, a plurality of switching assemblies, each of the switching assemblies comprising a plurality of spring biased switches, means for progressively actuating the spring biased switches of each of the switching assemblies to closed positions, said means comprising a spring biased armature member, a driving member carried by the armature member, and stabilizing means associated with the driving member for preventing sudden movement of the driving member, the stabilizing means being self-compensating for changes in temperature to give stable operation of the actuating means, the spring biased switches of one of the assemblies being disposed in interleaved relation relative to the spring biased switches of another of the assemblies, and electromagnetic means for actuating the stabilized and compensated actuating means to effect the progressive staggered release of the interleaved spring biased switches.

7. In a circuit controlling apparatus, in combination, a plurality of switching assemblies, each of the switching assemblies comprising a plurality of spring biased switches, means for progressively actuating the spring biased switches of each of the switching assemblies to closed positions, said means comprising a spring biased armature member, a driving member carried by the armature member, and stabilizing means associated with the driving member for preventing sudden movement of the driving member, the stabilizing means comprising a fixed air dashpot having a case and plunger movably disposed therein formed of stainless steel, the plunger being of a size to give a close sliding fit within the case, an elongated tubular stud carried by the case disposed to communicate with the air space therein, a port disposed in the side wall of the tubular stud, a valve disposed in the tubular stud for controlling the ingress and egress of air through the port to and from the air space in the case, means for mechanically coupling the plunger to the driving member whereby movement of the driving member is retarded by the dashpot, the stainless steel plunger and case being self-compensating for changes in temperature to give stable operation of the actuating means, the spring biased switches of one of the assemblies being disposed in interleaved relation relative to the spring biased switches of another of the assemblies, and electromagnetic means for actuating the stabilized and compensated actuating means to effect the progressive staggered release of the interleaved spring biased switches.

8. In a circuit controlling apparatus, in combination, a plurality of switching assemblies, each of the switching assemblies comprising a plurality of spring biased switches, means for progressively actuating the spring biased switches of each of the switching assemblies to closed positions, said means comprising a spring biased armature member, a driving member carried by the armature member disposed to engage the switches, the driving member having a stepped engaging face for engaging the switching assemblies in different order to actuate the switches of one of the assemblies in interleaved relation relative to the switches of another of the assemblies, and stabilizing means associated with the driving member for preventing sudden movement of the driving member, the stabilizing means being self-compensating for changes in temperature to give stable operation of the actuating means, and electromagnetic means for actuating the stabilized and compensated actuating means to effect the progressive staggered release of the spring biased switches of the different switching assemblies.

9. In a circuit controlling apparatus, in combination, an electromagnetic device comprising a core member, an energizing winding carried by the core member disposed to be energized in a predetermined manner, a pivotally mounted armature member disposed to be actuated when the winding is energized, a spring disposed to bias the armature member in a predetermined direction, and means for adjusting the bias of the spring, the adjusting means comprising an elongated stud having a thread over a portion thereof secured to the spring, a fixed support having a non-concentric opening therethrough for receiving the stud, the stud having a cross-section complementary to the opening in the fixed support and disposed to non-rotatably project therethrough, a gear nut disposed in threaded engagement with the threaded stud, the gear nut being seated against the fixed support by the tension of the spring, and means carried by the fixed support disposed to engage the gear nut when the nut is seated against the support to prevent rotation of the gear nut to change the tension of the spring, the stud being longitudinally movable through the opening against the bias of the spring to a position where the gear nut clears the engaging means whereby the gear nut may be turned to change the effective length and bias of the spring to change the bias on the armature member.

10. In a circuit controlling apparatus, in combination, a plurality of switching assemblies, each of the switching assemblies comprising a plurality of spring biased switches, a spring biased armature member disposed for actuating progressively the spring biased switches in a predetermined direction with the switches of one assembly being actuated in staggered relation with the switches of the other assembly, and electromagnetic means for actuating the armature member to effect a progressive staggered operation of the spring biased switches of the different switching assemblies in a direction opposite to said predetermined direction.

11. In a circuit controlling apparatus, in combination, a plurality of switching assemblies, each of the switching assemblies comprising a plurality of spring biased switches, a spring biased armature member disposed for actuating progressively the spring biased switches in a predetermined direction with the switches of one assembly being actuated in staggered relation with the switches of the other assembly, stabilizing means associated with the armature member for preventing sudden movement of the armature member, the stabilizing means being self-compensating for changes in temperature to give a stable operation of the armature member, and electromagnetic means for actuating the armature member to effect a progressive staggered operation of the spring biased switches of the different switching assemblies in a direction opposite to said predetermined direction.

12. In a circuit controlling apparatus, in combination, a plurality of switching assemblies biased in a predetermined direction, means including a coil spring disposed to bias the switching assemblies in a direction opposite to the predetermined direction, a fixed support having an opening therethrough provided with a flat side, and an adjustable means disposed for securing the coil spring to the fixed support to maintain the bias in said opposite direction, the adjustable means comprising an elongated stud having a thread provided over a portion thereof at one end and at least a portion adjacent the other end having a cross-section complementary to the opening in the fixed support and disposed to non-rotatably project therethrough, the coil spring being secured to said other end of the stud, a gear nut disposed in threaded engagement with the threaded end of the stud and seated against the fixed support by the pull of the coil spring, means carried by the fixed support disposed for engagement with the gear nut when the nut is seated against the support to prevent rotation of the gear nut to change the bias of the coil spring, said stud being longitudinally movable through the opening against the bias of the coil spring to a position where the gear nut clears the engaging means carried by the support whereby the nut may be turned to change the effective length and bias of the coil spring.

RUEL C. JONES.